US006405638B1

(12) United States Patent
Chen (10) Patent No.: US 6,405,638 B1
(45) Date of Patent: Jun. 18, 2002

(54) HOT DRINK STEEPING POT WITH PIVOTING STRAINER

(76) Inventor: Chih-Liang Chen, No. 10, Lane 1431, Kuanghsing Rd., Pateh City, Taoyuan Hsien (TW)

(*) Notice: Subject to any disclaimer, the term of this patent is extended or adjusted under 35 U.S.C. 154(b) by 0 days.

(21) Appl. No.: 09/766,008

(22) Filed: Jan. 18, 2001

(51) Int. Cl.[7] .................................................. A47J 31/00
(52) U.S. Cl. .............................. 99/318; 99/322; 99/317
(58) Field of Search .......................... 99/318, 317, 319, 99/322, 323, 306

(56) References Cited

U.S. PATENT DOCUMENTS

| 523,344 A | * | 7/1894 | Hancock ....................... 99/322 |
| 1,412,674 A | * | 4/1922 | Campbell, Jr. ............... 99/322 |
| 6,276,262 B1 | * | 8/2001 | Chen ............................ 99/322 |

FOREIGN PATENT DOCUMENTS

| DE | 380523 | * | 2/1921 | .................. 99/318 |
| GB | 27958 | * | 12/1911 | .................. 99/318 |

* cited by examiner

*Primary Examiner*—Reginald L. Alexander
(74) *Attorney, Agent, or Firm*—Kolisch Hartwell Dickinson McCormack & Heuser (57) ABSTRACT

A hot drink steeping pot includes a jug (10), a strainer (12) pivotally receivable in the jug (10), and a cover (13) mounted on the jug (10), such that the strainer (12) is enclosed. With the cover (13) removed from the jug (10), flavoring agent is stored in the strainer (12) in its lowered position. To remove the flavoring agent, the user rotates the tabs (1266) such that the strainer (12) is moved to the raised position, and excess fluid can drain from the flavoring agent into the jug (10). The combined cover (13) and strainer (12) can be removed from the jug (10) and inverted such that no dripping or falling of flavoring agent onto clothes or carpets can occur, and the flavoring agent can be conveniently discarded.

9 Claims, 7 Drawing Sheets

HOT DRINK STEEPING POT WITH PIVOTING STRAINER

BACKGROUND OF THE INVENTION

1. Field of the Invention

The present invention relates to a hot drink steeping pot with a pivoting strainer, and more particularly a steeping pot with a strainer which can move from a position suspended in hot water to a position suspended above the hot water, whereby no mess from wet particles occurs, and overbrewing of the drink is eliminated.

2. Description of Related Art

Hot drinks have been a very important source of nutrition and relaxation for perhaps thousands of years, and often a traditional process is involved whether the hot drink is tea, coffee, etc.

Tea making has been a process both formal and informal for countless generations all over the world, whereby both simple quenching of thirst and elaborate cultural ceremonies may be achieved. Despite differences in the enjoyment of tea, such as whether milk is included, the amount of tea generally consumed at one sitting, the prior treatment of the tealeaves by the processor, etc, the fundamental preparation of the drink itself remains the same—leaves are suspended in very hot water until the desired flavor is reached. The common problem all over the world is the removal of wet leaves either once the flavor has been reached to avoid overbrewing of the tea, or when the leaves are exhausted of flavor and have to be discarded. If the leaves are to be temporarily retained for further steeping, it is difficult to find somewhere to put them that is conveniently accessible yet safe enough to prevent damage to furniture and furnishing from the sodden leaves.

A similar situation to that previously described also exists for ground coffee. That is, the grounds may be needed later for further steeping once the level of flavor has been attained, yet coffee stains arising from saturated grounds are extremely difficult to remove from cloth, carpeting, etc and so the real enjoyment from a perfect cup of coffee may not be achieved due to overbrewing, anxiety over possible spillage, and so on.

Thus, there is a long and unfulfilled need for a hot drinks steeping pot wherein a leaf or grounds filter is internally movable from a position suspended in hot water of the pot to a position suspended above the hot water such that the leaves or grounds can be steeped precisely for the duration required and then stored safely and temporarily until further steeping is required or discarded at the appropriate time.

SUMMARY OF THE INVENTION

The object of the present invention is to provide a hot drink steeping pot with an internal strainer that is movable between a position suspended in hot water contained in the pot to a position suspended above the hot water, whereby consumers can enjoy their hot drinks safe in the knowledge that the hot drink is brewed to the appropriate concentration, and the flavor-inducing agent can be reintroduced to hot water from further brewing.

A further object of the present invention is to provide a hot drink steeping pot with an internal strainer whereby the flavor-inducing agent can be stored safely and conveniently prior to disposal.

The hot drink steeping pot in accordance with the present invention has a base, a cover securable with the base, and a strainer cup pivotably receivable between the base and the cover. The strainer cup has handles by which it can be securely retained in either a position above hot water of the base or in the hot water. The strainer cup is disengagable with the base whereby the flavor-inducing agent, when it has substantially lost most of its water content through drainage, can be easily carried to a trash can etc.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
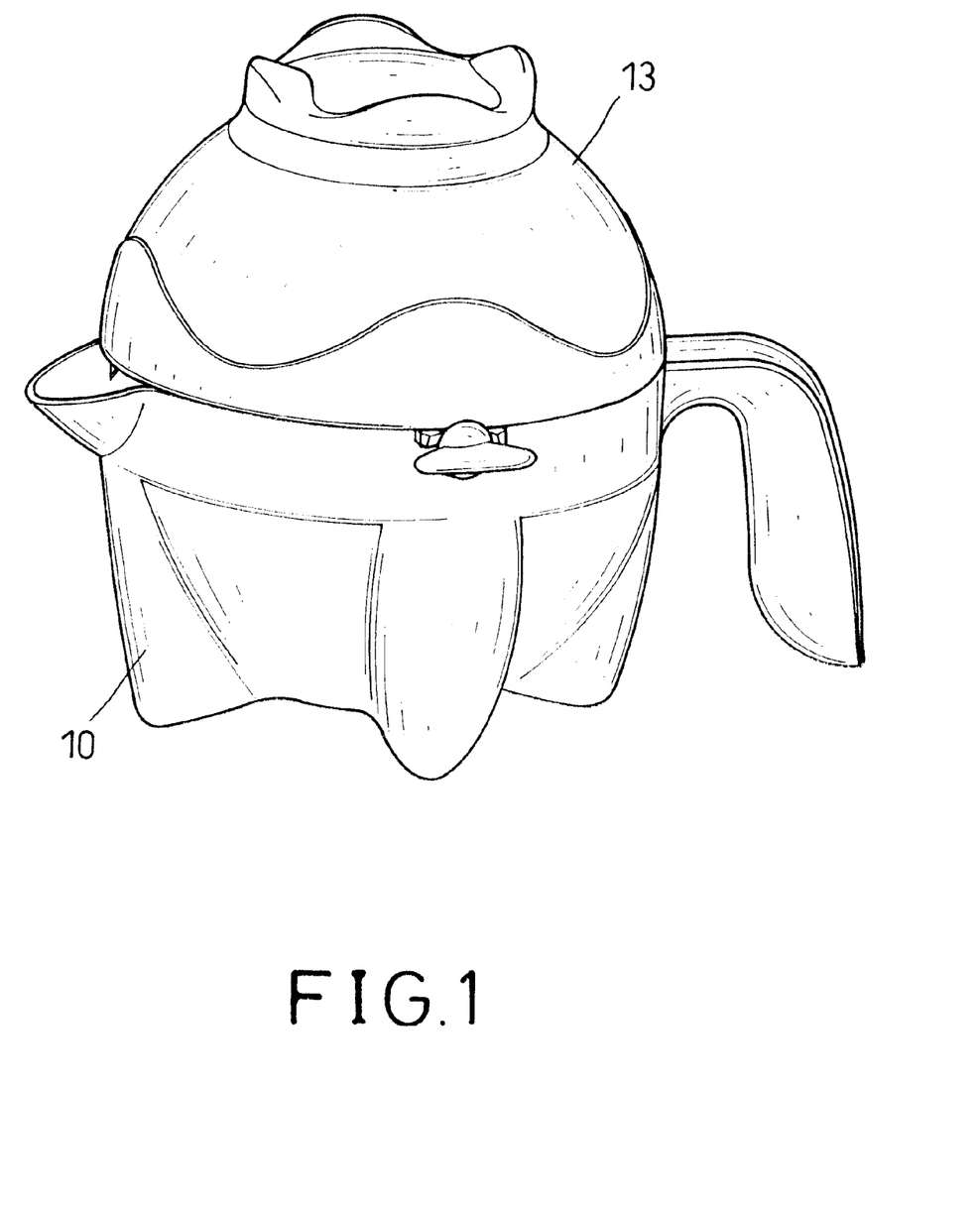
FIG. 1 is a perspective view of a hot drink steeping pot with a pivoting strainer in accordance with the present invention.
Figure 2:
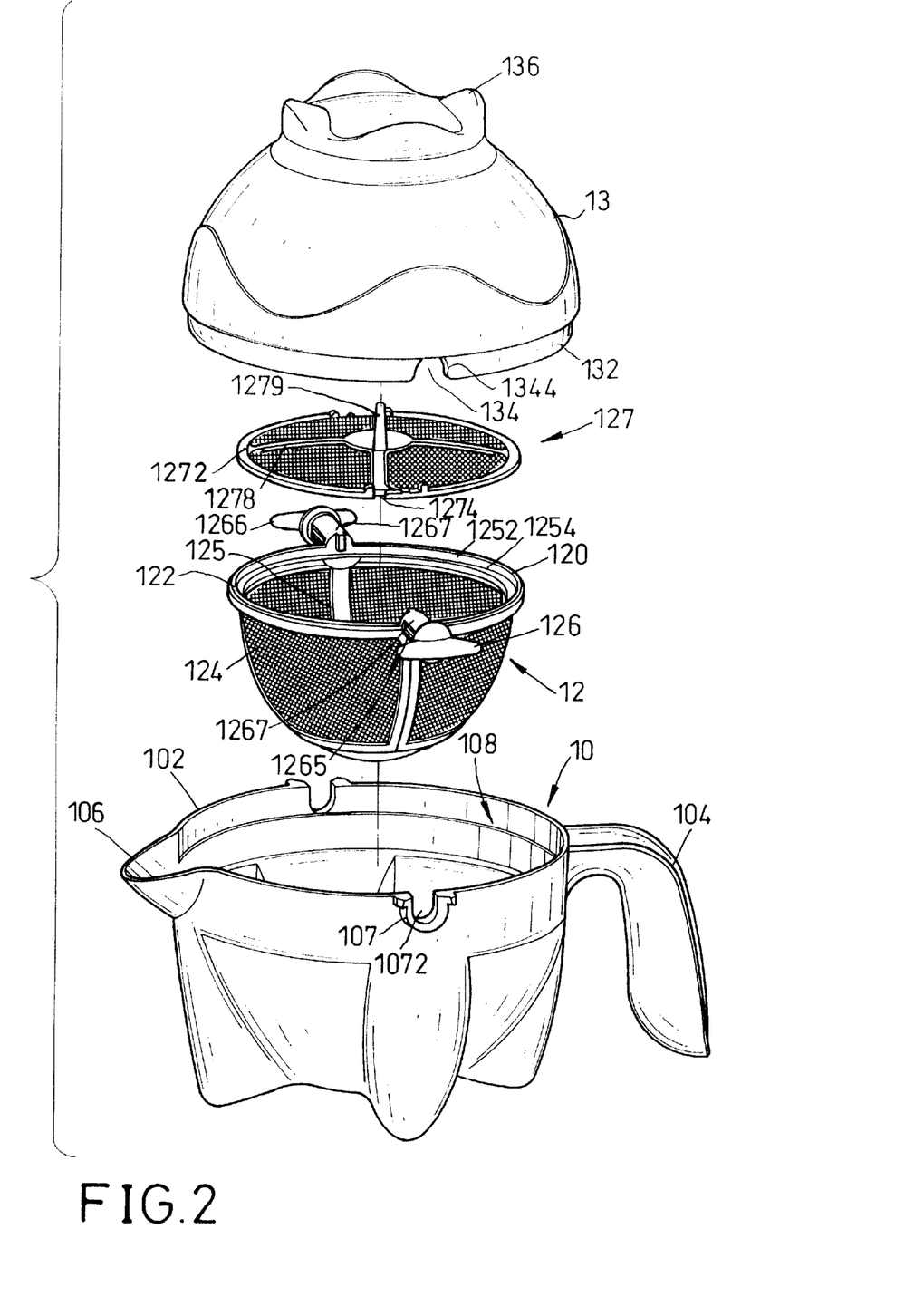
FIG. 2 is an exploded view of the hot drink steeping pot of FIG. 1.

Referring to the figures and especially FIGS. 1 and 2, a hot drink steeping pot with a pivoting strainer includes a jug (10), a cover (13) mountable on the jug (10), and a strainer (12) pivotally receivable between the cover (13) and the jug (10).

The jug (10) comprises a side wall, a closed bottom, a top opening defined by a rim (102), a handle (104) integrally extending outward from the side wall, a pouring spout (106) formed in the rim (102) and opposite to the handle (104), and two opposed pivot lugs (107) which are perpendicular in a lateral plane to the spout (106) and the handle (104). Each lug (107) comprises a U-shaped wall extending from an outer face of the rim (102) of the jug (10), and a U-shaped passage (1072). A peripheral step (108) extends around an inner face of the rim and substantially meets a bottom of each of the passages (1072).

The cover (13) includes a bowl with a bottom opening defined by a circumferential lip (132), two opposed recesses (134) defined in the lip (132) and each shaped as an inverted U, and a closed top with at least three feet (136) extending from an upper face thereof. The lip (132) has an outer diameter sized to be snugly receivable in the rim (102) of the jug (10) and abutting the peripheral step (108). Each recess (134) has a closed end with a surface formed with a plurality of ridges (1342), and an open end with two opposed straight walls (1344).

Figure 5:
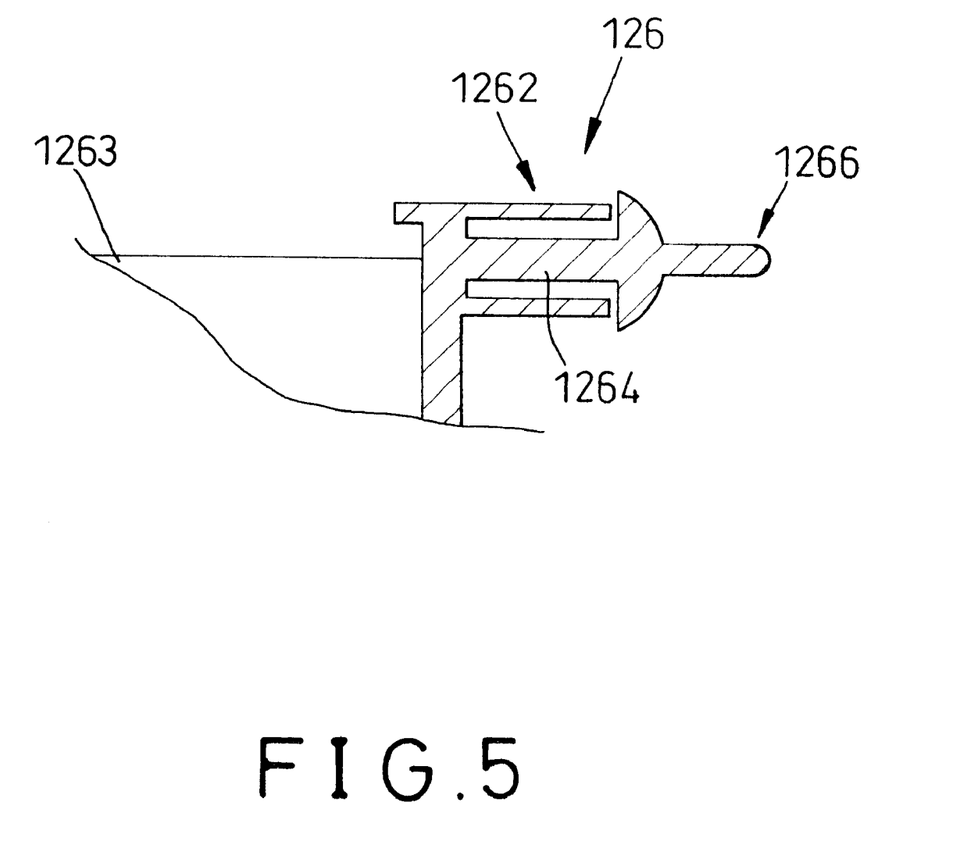
FIG. 5 is a cross-sectional view of a pivot handle of the strainer cup.
Figure 6:
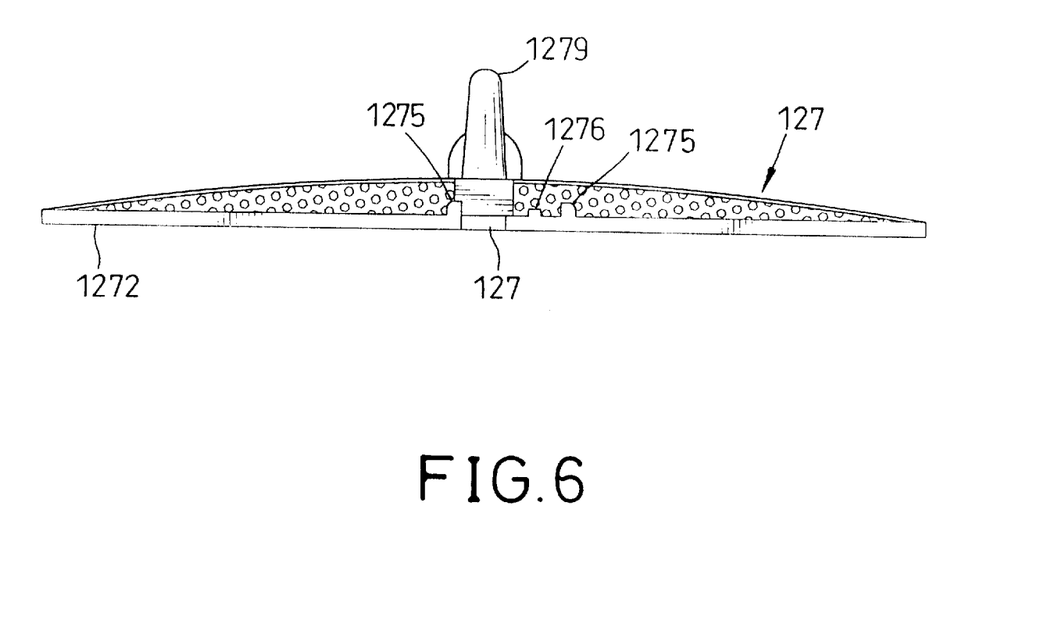
FIG. 6 is an enlarged partial side view of a lid of the strainer cup.

Still referring to FIGS. 1 and 2, and referring further to FIG. 5, the strainer (12) includes a frame (120) with a top edge (122) defining an entrance (125), a first mesh (124) mounted around the frame (120) and forming a cup, two opposed pivot handles (126) extending outward from the top edge (122), and a lid (127). The entrance (125) has an inner step formed by an upright wall (1252) and lateral face (1254). The lid (127) is snugly receivable in the top edge (122) and rests on the lateral face (1254) to close the entrance (125). As shown in FIG. 5, each handle (126) includes a resilient tube (1262) with a distal end, a rod (1264) integrally extending from within the tube (1262) and protruding from the distal end, and a tab (1266) formed on a distal tip of the rod (1264). Each tab (1266) has a dome with a back wall adjoining the distal end of the rod (1264) and a flat plate (1268) extending from the dome. An inner end face of the tube (1262) of the handle (126) is flush with the upright wall (1252) of the entrance (125). An upper half of the tube (1262) has longitudinal ridges (1267) formed thereon, and a lower half of the tube (1262) is smooth. Each tube (1262) has two opposed flats (1265) and a distance between each two flats (1265) is slightly smaller than a distance between the opposed sidewalls (1344). Each handle (126) has a stub (1263) formed on the inner end face, and a gap is defined between an underface of each stub (1263) and the lateral face (1254) of the entrance (125). Referring to FIG. 6, the lid (127) has a rim (1272) sized to be snugly receivable in the opening (125) and has a height nominally smaller than the gap between the stubs (1263) and the lateral face (1254). Two opposed slots (1274) are defined in the rim (1272) of the lid (127) and are sized to allow the stubs (1263) to pass vertically therethrough. Each slot (1274) has two stops (1275) respectively formed on either side thereof and extending upward from a top face of the lid (127). A protuberance (1276) is formed between each pair of stops (1275). A second mesh (1278) covers a bottom face of the lid (127). Four ribs extend from the rim (1272) to make a central portion, and a grip (1279) extends upward from the central portion.

Figure 3:
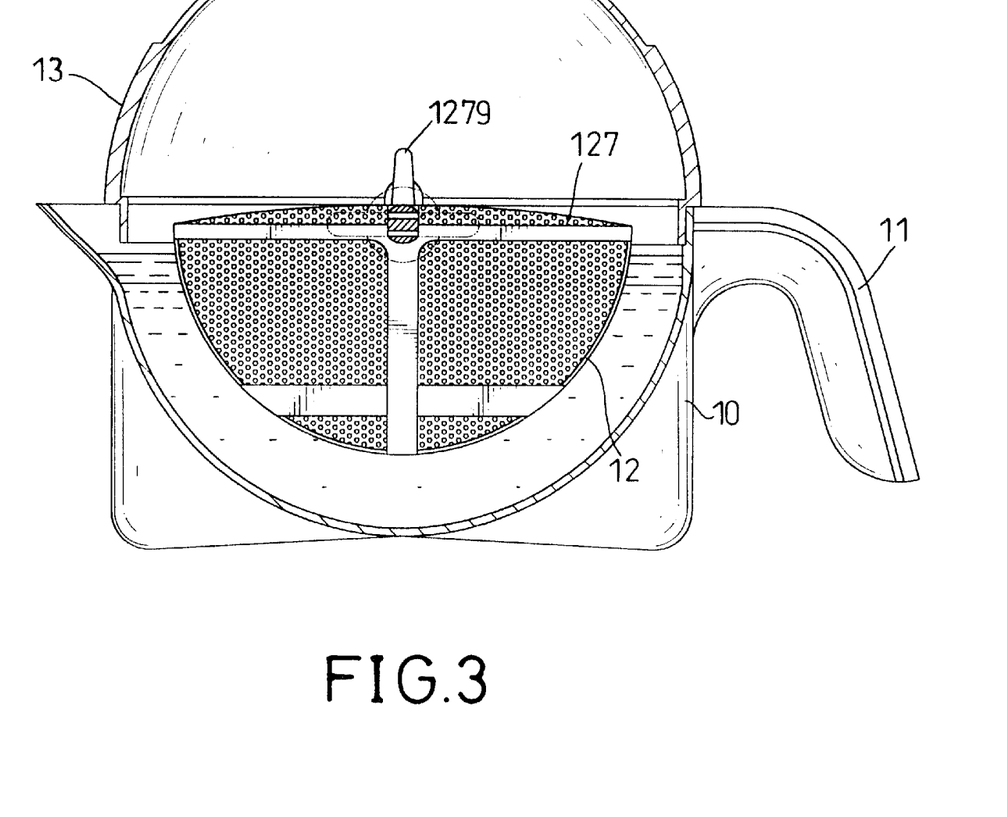
FIG. 3 is a cross-sectional view of the hot drink steeping pot of FIG. 1, with a strainer cup thereof in a lowered position.

In assembly, referring to FIGS. 1, 2 and 3, the lid (127) is fitted to the frame (120) by aligning the slots (1274) respectively with the stubs (1263) whereby the lid (127) drops down onto the lateral face (1254), whereafter the user twists the lid (127) relative to the frame (120) such that each stub (1263) is releasably retained between the respective stop (1275) and the protuberance (1276). The other stops (1275) prevent the lid (127) from being twisted in an inappropriate direction. The strainer (12) is then mounted to the jug (10) by locating the tubes (1262) of the strainer (12) respectively in the passages (1072) of the pivot lugs (107). Finally, the cover (13) is mounted to the combined jug and strainer (10,12) by engaging the lip (132) in the rim (102) of the jug (10) and aligning the recesses (134) of lip (132) with the tubes (1262) of the strainer (12).

Figure 4:
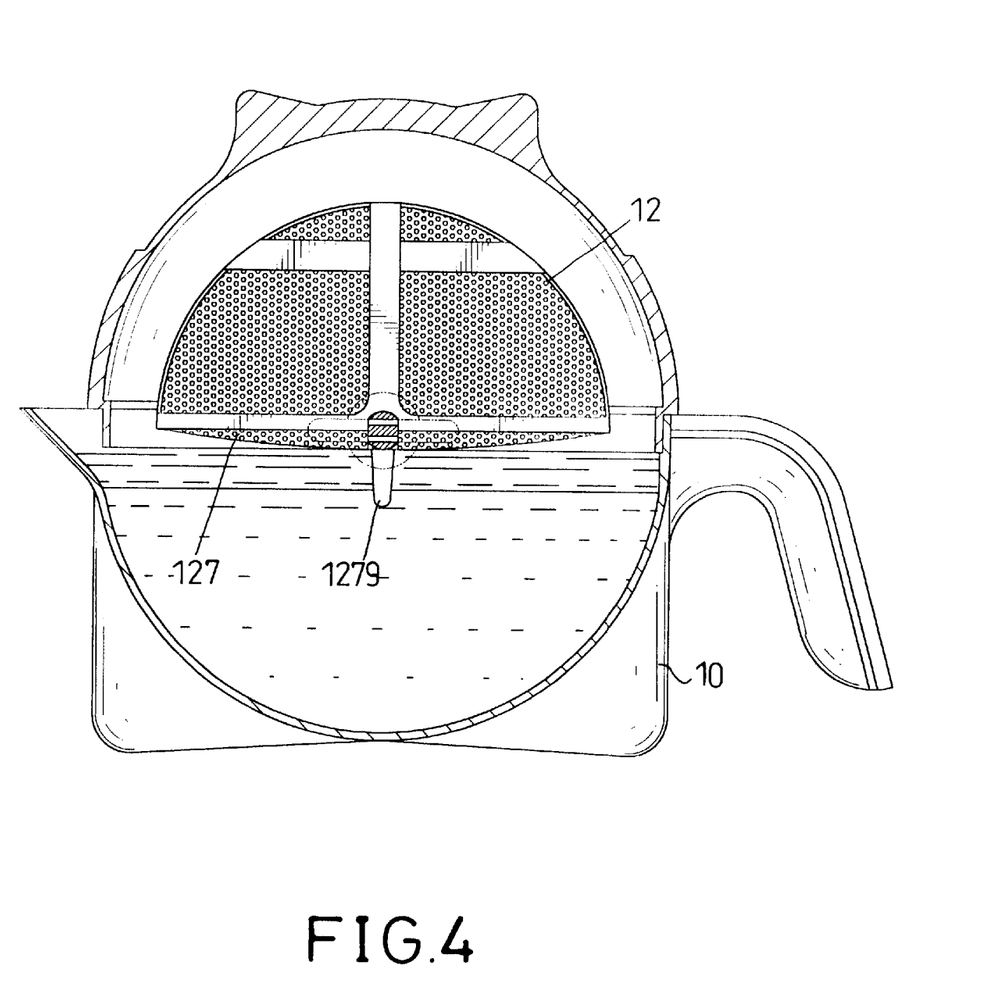
FIG. 4 is a cross-sectional view of the hot drink steeping pot of FIG. 1, with the strainer cup in a raised position.

Referring to FIG. 3, in use the strainer (12) is in a lowered position such that a flavor-inducing agent (not shown) such as tea leaves is suspended in hot water contained in the jug (10), whereby tea is brewed until the desired intensity is achieved. Then, referring to FIG. 4, the strainer (12) is pivoted to a raised position above the hot tea water, whereby any excess water in the tealeaves drains therefrom into the jug (10). The user then can choose to later lower the strainer (12) to the lowered position and add fresh hot water for a further brew of tea, or remove and invert the cover (13) combined with the strainer (12) for disposal of the tealeaves. It is to be noted that the engagement between the ridges (1342) of the cover (13) and the longitudinal ridges (1267) holds the strainer in the raised position. Furthermore, an interference fit between corresponding pairs of the sidewalls (1344) of the cover (13) and flats (1265) of the strainer (12) prevents the strainer (12) from unintentionally disengaging from the cover (13) when the latter is being removed from the jug (10). When required, for example at a waste bin, the interference fit between the cover (12) and the strainer (13) can be overcome by a user. Then, the user holds the grip (1279) to extract the strainer (12) from the cover (13), whereafter the fitting process of the lid (127) with the frame (120) previously described is reversed such that the tealeaves can be conveniently discarded. It is to be appreciated that although tealeaves have been given as an example of a flavoring agent, any other flavoring agent commonly found in the use of strainers is practical.

Figure 7:
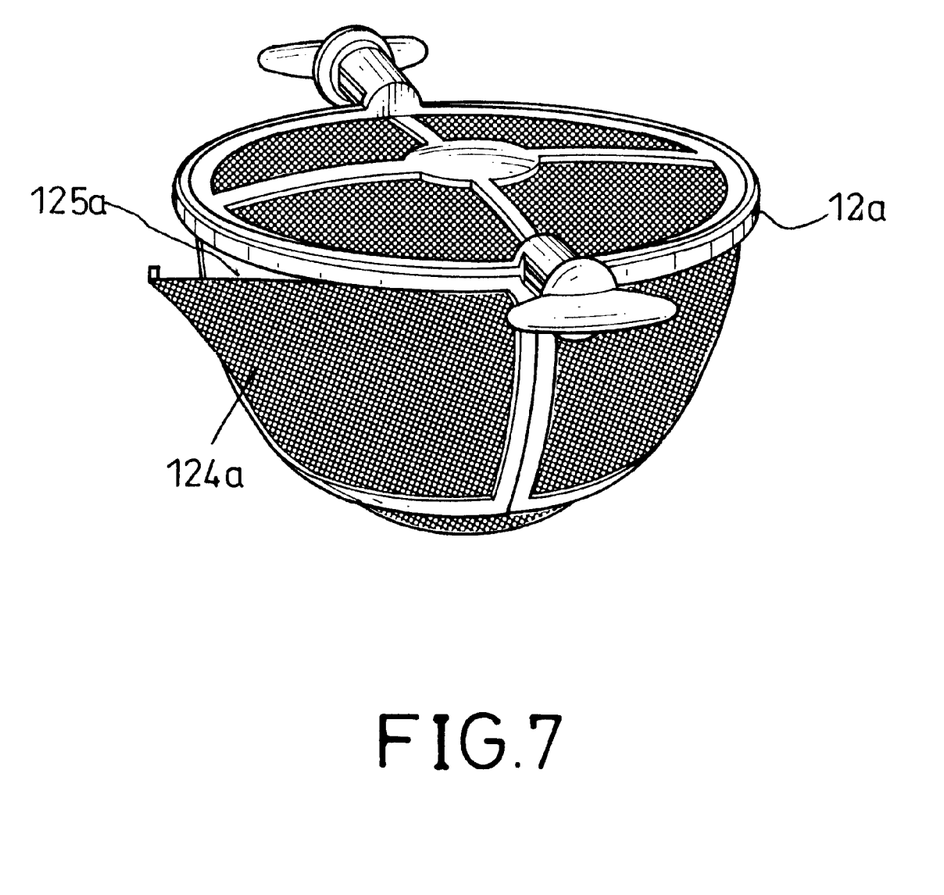
FIG. 7 is a perspective view of a second embodiment of the hot drink steeping pot of FIG. 1.

Referring to FIG. 7, a second embodiment of the present invention differs from the first embodiment only in that the strainer (12a) has a lid (127a) integrally formed with the frame (120a) and the entrance (125a) is defined in the mesh (124a) by a flap (1242a). A catch (1244a) is formed on a distal corner of the mesh (124a) to snappingly engage with the frame (120a), whereby the entrance (125a) is opened or closed.

The steeping pot for hot drinks in accordance with the present invention has the following advantages:

(i) convenience of achieving flavor intensity. The simplicity of raising and lowering the strainer makes a user much more likely to acquire the optimum flavor of the hot drink when compared to the prior art steeping pots wherein it is so bothersome to remove the flavoring agent that a user may sacrifice the flavor in order to rest.

(ii) safety. The internal removal of the hot flavoring agent from the hot water prevents any scalding which may occur with prior art pots.

(iii) cleanliness. The internal removal and temporary storage of the leaves for later re-use eliminates the risk of staining clothes, carpets etc, due the hot drink otherwise leaking from the damp flavoring agent.

(iv) convenience in removal of exhausted flavoring agent. By inverting the cover to act as a bowl, the exhausted flavoring agent in the strainer can be safely removed from the jug and then disposed of.

Although the present invention has been explained in relation to its preferred embodiment, it is to be understood that many other possible modifications and variations can be made without departing from the spirit and scope of the invention as hereinafter claimed.

What is claimed is:

1. A hot drink steeping pot for receiving a flavoring agent and hot fluid therein, comprising:

a jug formed with two passages formed opposedly on a rim thereof;

a cover mountable on the rim of the jug and formed with two recesses corresponding to the passages of the jug;

a strainer adapted for receiving the flavoring agent, and a pivot device including two opposed handles extending from the strainer, each handle comprising a resilient tube with a distal end and an end face, a stub extending from the end face, a rod integrally extending from within the tube and protruding from the distal end of the tube, and a tube formed on a top of the rod, wherein the resilient tube has an upper portion formed with longitudinal ridges, the handles being respectively and rotatably received in the recesses or the cover and the passages of the jug, wherein the strainer is pivotally mountable between the combined jug and the cover, the strainer is extendable between a lowered position and a secured raised position whereby in the lowered position the strainer is rested in the jug and the flavoring agent is steeped in the hot fluid, and in the secured raised position the strainer is rested in the cover and the flavoring agent is suspended above the jug.

2. The hot drink steeping pot as claimed in claim 1, wherein each tab comprises a dome with a backwall adjoining the tip of the rod, and a flat plate extending from the dome.

3. The hot drink steeping pot as claimed in claim 1, wherein the recesses of the cover are each shaped as an inverted U with a closed end and two straight walls, the closed ends of each recess being formed with splines to engage with the longitudinal ridges of the handles, whereby the strainer is securable in the secured raised position.

4. The hot drink steeping device as claimed in claim 1, wherein the strainer further comprises a frame defining an entrance, a first mesh mounted around the frame and forming a cup, and a lid with a rim snugly receivable in the entrance of the frame and having a second mesh, whereby the flavoring agent is securely retainable in the strainer.

5. The hot drink steeping pot as claimed in claim 4, wherein a securing device of the strainer comprises two opposed slots defined in the rim and each slot has a first stop formed immediately on one side thereof, and a second stop separated from another side thereof by a step with a height sized to pass below the respective stub of the handle, whereby the lid is securely retainable with the frame.

6. The hot drink steeping pot as claimed in claim 5, wherein each step has a protuberance formed on a top face thereof to snappingly lock the lid with the frame.

7. The hot drink steeping pot as claimed in claim 1, wherein the strainer comprises a single piece frame with a mesh enclosing the single piece frame, the mesh having a distal edge detachably securable with the frame and defining an entrance to the frame.

8. The hot drink steeping pot as claimed in claim 1, wherein a securing device of the strainer comprises two opposed slots defined in the rim and each slot has a first stop formed immediately on one side thereof, and a second stop separated from another side thereof by a step with a height sized to pass below the respective stub of the handle, whereby the lid is securely retainable with the frame.

9. The hot drink steeping device as claimed in claim 1, wherein the strainer further comprises a frame defining an entrance, a first mesh mounted around the frame and forming a cup, and a lid with a rim snugly receivable in the entrance of the frame and having a second mesh integrally formed with the first mesh, whereby the flavoring agent is securely retainable in the strainer.

* * * * *